(12) United States Patent  
Magario et al.

(10) Patent No.: US 7,803,297 B2
(45) Date of Patent: Sep. 28, 2010

(54) COMPOSITE MATERIAL AND METHOD OF PRODUCING THE SAME, AND COMPOSITE METAL MATERIAL AND METHOD OF PRODUCING THE SAME

(75) Inventors: Akira Magario, Takeshi-mura (JP); Toru Noguchi, Ueda (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 0 days.

(21) Appl. No.: 11/219,706

(22) Filed: Sep. 7, 2005

(65) Prior Publication Data

US 2006/0057386 A1  Mar. 16, 2006

(30) Foreign Application Priority Data

Sep. 9, 2004  (JP) ............................. 2004-262391

(51) Int. Cl.
*B29C 59/00* (2006.01)
*B22D 19/14* (2006.01)

(52) U.S. Cl. ................ 264/122; 264/80; 264/118; 264/140; 264/175; 264/241; 264/345; 148/538; 164/97; 428/408; 523/210; 524/495

(58) Field of Classification Search ................ None
See application file for complete search history.

(56) References Cited

U.S. PATENT DOCUMENTS 3,297,667 A * 1/1967 Von Dohlen et al. ........ 526/160
3,482,963 A * 12/1969 Osborn et al. .................. 75/352
3,619,430 A * 11/1971 Hiratsuka et al. .......... 264/29.1

3,828,839 A * 8/1974 Dhingra ........................ 164/97
4,351,484 A * 9/1982 Hart ............................. 241/30

(Continued)

FOREIGN PATENT DOCUMENTS

EP  1 600 231 A1  11/2005

(Continued)

OTHER PUBLICATIONS

Toru Noguchi, et al, "Carbon Nanotube/Aluminum Composites with Uniform Dispersion", *Materials Transactions*, vol. 45, No. 2, pp. 602-604, (2004).

(Continued)

*Primary Examiner*—Jeffrey Wollschlager
(74) *Attorney, Agent, or Firm*—Oliff & Berridge, PLC

(57) ABSTRACT

A method of producing a composite material which includes a carbon-based material and a particulate or fibrous metal material Z. The method includes steps (a) to (c). In the step (a), at least a first carbon material and the metal material Z mixed into an elastomer, and dispersing the first carbon material and the metal material Z by applying a shear force to obtain a composite elastomer, the metal material Z having a melting point lower than a melting point of the first carbon material. In the step (b), the composite elastomer is heat-treated to vaporize the elastomer to obtain an intermediate composite material including a second carbon material and the metal material Z. In the step (c), the intermediate composite material is heat-treated together with a substance including an element Y having a melting point lower than the melting point of the metal material Z to vaporize the substance including the element Y.

38 Claims, 7 Drawing Sheets

U.S. PATENT DOCUMENTS

| | | | | |
|---|---|---|---|---|
| 4,450,207 | A | * | 5/1984 | Donomoto et al. .......... 428/614 |
| 4,902,457 | A | * | 2/1990 | Wada et al. ................. 264/414 |
| 5,348,592 | A | * | 9/1994 | Garg et al. ................. 148/208 |
| 5,372,775 | A | * | 12/1994 | Hayashi et al. ............... 419/10 |
| 5,458,181 | A | * | 10/1995 | Corbett et al. ................ 164/97 |
| 5,573,607 | A | * | 11/1996 | Weaver ....................... 148/437 |
| 5,744,235 | A | * | 4/1998 | Creehan .................... 428/364 |
| 6,193,915 | B1 | * | 2/2001 | Lo et al. ...................... 264/44 |
| 6,538,166 | B1 | * | 3/2003 | Mahjoob ................... 585/241 |
| 2004/0182285 | A1 | * | 9/2004 | Mazany et al. ............. 106/600 |
| 2004/0241440 | A1 | | 12/2004 | Noguchi et al. |
| 2005/0075443 | A1 | | 4/2005 | Noguchi et al. |
| 2005/0192396 | A1 | | 9/2005 | Noguchi et al. |
| 2005/0194115 | A1 | | 9/2005 | Noguchi et al. |
| 2006/0016522 | A1 | | 1/2006 | Noguchi et al. |

FOREIGN PATENT DOCUMENTS

| | | |
|---|---|---|
| EP | 1 632 457 A2 | 3/2006 |
| JP | A 05-78110 | 3/1993 |

OTHER PUBLICATIONS

U.S. Appl. No. 11/133,204, filed May 20, 2005, Toru Noguchi et al.
U.S. Appl. No. 11/134,292, filed May 23, 2005, Akira Magario et al.
U.S. Appl. No. 11/180,573, filed Jul. 14, 2005, Toru Noguchi et al.
U.S. Appl. No. 11/183,753, filed Jul. 19, 2005, Akira Magario et al.
U.S. Appl. No. 11/214,737, filed Aug. 31, 2005, Akira Magario et al.
U.S. Appl. No. 11/219,707, filed Sep. 7, 2005, Akira Magario et al.
Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).
Magario et al., "Structure and Properties for Carbon Nanofiber/Alminium Nanocomposites," Oct. 11, 2003, 133d Collected Abstracts of the 2004 Autumn Meeting of the Japan Institute of Metals, pp. 566, (with English-language translation of relevant portions).
T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).
Noguchi et al., "Dynamic Properties for CNT/AI Nanocomposites," Mar. 30, 2004, 134th Collected Abstracts of the 2004 Spring Meeting of the Japan Institute of Metals, pp. 353, (with English-language translation of relevant portions).
Magario et al., "Structure and Thermal Properties for CNT/AI Nanocomposites," Mar. 30, 2004, 134th Collected Abstracts of the 2004 Spring Meeting of the Japan Institute of Metals, pp. 353, (with English-language translation of relevant portions).
Noguchi et al., "Preparation and Properties of Aluminum Nanocomposites by Matrix Substitution of Carbon Nanotube/Elastomer Composites," May 20, 2004, 71st The Society of Rubber Industry, Japan Annual Meeting, pp. 30, (with English-language translation of relevant portions).
Noguchi et al., "Development of Carbon Nanotubes/Aluminum Composites and Expectation as Lightweight Member," Aug. 1, 2004, Engineering Materials, vol. 52, No. 8, (with English-language translation of relevant portions).
Magario et al., "CNT Peripheral Structure of CNT/AI Nanocomposites," Sep. 28, 2004; 135th Collected Abstracts of the 2004 Autumn Meeting of the Japan Institute of Metals, pp. 568, (with English-language translation of relevant portions).
Noguchi et al., "Thermal Expansion of CNT/AI Nanocomposites," Sep. 28, 2004, 135th Collected Abstracts of the 2004 Autumn Meeting of the Japan Institute of Metals, pp. 569, (with English-language translation of relevant portions).
European Office Action issued Mar. 9, 2010 in Application No. 05 255 523.2.
U.S Office Action issued in related U.S. Appl. No. 11/183,753 dated Mar. 22, 2010.

* cited by examiner

PARTIALLY ENLARGED VIEW

COMPOSITE MATERIAL AND METHOD OF PRODUCING THE SAME, AND COMPOSITE METAL MATERIAL AND METHOD OF PRODUCING THE SAME

Japanese Patent Application No. 2004-262391, filed on Sep. 9, 2004, is hereby incorporated by reference in its entirety.

BACKGROUND OF THE INVENTION

The present invention relates to a composite material and a method of producing the same, and a composite metal material and a method of producing the same.

A composite material using a carbon material such as carbon fiber carbon black, graphite, or carbon nanofiber has attracted attention (see JP-A-5-78110, for example). Such a composite material is expected to exhibit improved electric conductivity, heat transfer properties, and mechanical strength due to inclusion of the carbon material such as carbon nanofiber.

However, the carbon material generally exhibits low wettability (affinity) with a matrix material of the composite material and exhibits low dispersibility in the matrix material. In particular, since the carbon nanofibers have strong aggregating properties, it is very difficult to uniformly disperse the carbon nanofibers in a matrix of the composite material. Therefore, it is difficult to obtain a carbon nanofiber composite material having desired properties. Moreover, expensive carbon nanofibers cannot be efficiently utilized.

SUMMARY

According to a first aspect of the invention, there is provided a method of producing a composite material which includes a carbon-based material and a particulate or fibrous metal material Z, the method comprising:

(a) mixing at least a first carbon material and the metal material Z into an elastomer, and dispersing the first carbon material and the metal material Z by applying a shear force to obtain a composite elastomer, the metal material Z having a melting point lower than a melting point of the first carbon material;

(b) heat-treating the composite elastomer to vaporize the elastomer included in the composite elastomer to obtain an intermediate composite material including a second carbon material and the metal material Z; and (c) heat-treating the intermediate composite material together with a substance including an element Y having a melting point lower than the melting point of the metal material Z to vaporize the substance including the element Y.

According to a second aspect of the invention, there is provided a composite material obtained by the above-described method of producing a composite material.

According to a third aspect of the invention, there is provided a composite material which includes a carton-based material and a particulate or fibrous metal material Z, wherein:

the carbon-based material has a first bonding structure and a second bonding structure on a surface of a carbon material;

the first bonding structure is a structure in which an element X bonds to a carbon atom of the carbon material;

the second bonding structure is a structure in which an element Y bonds to the element X;

the element X includes at least one element selected from boron, nitrogen, oxygen, and phosphorus;

the element Y includes at least one element selected from magnesium, aluminum, silicon, calcium, titanium, vanadium, chromium, manganese, iron, nickel, copper, zinc, and zirconium; and the metal material Z is aluminum or magnesium.

According to a fourth aspect of the invention, there is provided a method of producing a composite metal material, the method comprising:

(d-1) powder forming the composite material obtained by the above-described method of producing a composite material.

According to a fifth aspect of the invention, there is provided a method of producing a composite metal material, the method comprising:

(d-2) casting the composite material obtained by the above-described method of producing a composite material.

According to a sixth aspect of the invention, there is provided a method of producing a composite metal material, the method comprising:

(d-3) causing a molten matrix metal material to permeate die composite material obtained by the above-described method of producing a composite material, wherein a material for the matrix metal material is the same as a material for the metal material Z.

According to a seventh aspect of the invention, there is provided a composite metal material obtained by any of the above-described methods of producing a composite metal material.

DETAILED DESCRIPTION OF THE EMBODIMENT

Figure 1:
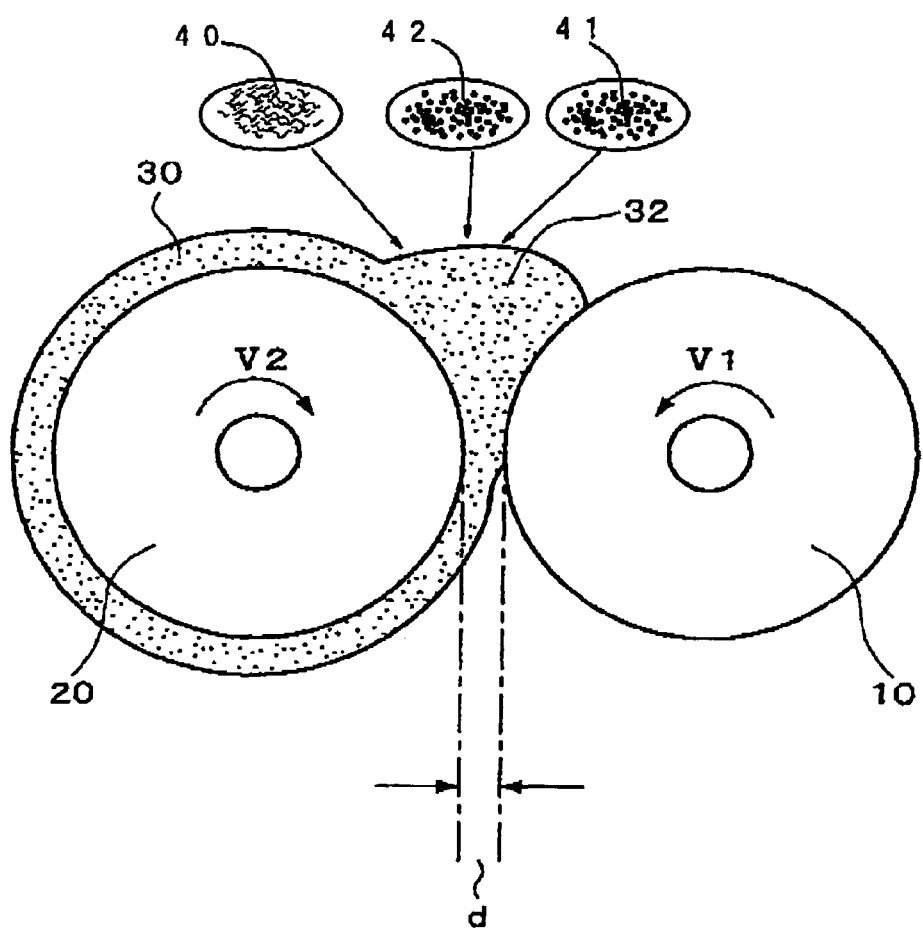
FIG. 1 schematically shows a mixing method for an elastomer and a carbon material utilizing an open-roll method used in one embodiment of the invention.

The invention may provide a composite material including a carbon-based material exhibiting improved surface wettability, and a method of producing the same. The invention may also provide a composite metal material in which a carbon material is uniformly dispersed, and a method of producing the same.

According to one embodiment of the invention, there is provided a method of producing a composite material which includes a carbon-based material and a particulate or fibrous metal material Z, the method comprising:

(a) mixing at least a first carbon material and the metal material Z into an elastomer, and dispersing the first carbon material and the metal material Z by applying a shear force to obtain a composite elastomer, the metal material Z having a melting point lower than a melting point of the first carbon material;

(b) heat-treating the composite elastomer to vaporize the elastomer included in the composite elastomer to obtain an intermediate composite material including a second carbon material and the metal material Z; and (c) heat-treating the intermediate composite material together with a substance including an element Y having a melting point lower than the melting point of the metal material Z to vaporize the substance including the element Y.

According to the step (a) of the method according to one embodiment of the invention, free radicals formed in the elastomer shorn by the shear force attack the surface of the first carbon material, whereby the surface of the first carbon material is activated. Therefore, the dispersibility of the first carbon material in the elastomer is improved. When using carbon nanofibers as the first carbon material, since an unsaturated bond or group of the elastomer bonds to an active site of the carbon nanofiber, particularly to a terminal radical of the carbon nanofiber, the aggregating force of the carbon nanofibers is reduced, whereby the dispersibility of the carbon nanofiber can be increased.

According to the step (b) of the method according to one embodiment of the invention, the second carbon material having an activated surface is obtained by vaporizing the elastomer by the heat treatment. According to the step (c) of the method according to one embodiment of the invention, the substance including the element Y is vaporized by the heat treatment so that the element Y adheres to the surface of the second carbon material, whereby the carbon-based material exhibiting improved wettability with the matrix material is obtained. Moreover, since the second carbon material is heat-treated together with the particulate or fibrous metal material Z, a composite material containing the metal material Z and the carbon-based material is obtained. Therefore, the composite material obtained by the method according to one embodiment of the invention can be easily utilized for general metalworking such as casing. A composite metal material having desired properties can be produced by adjusting the mixing ratio of the metal material Z to the carbon-based material. Moreover, since the metal material Z exists in the steps (b) and (C), reaggregation of the carbon material can be prevented.

The elastomer according to one embodiment of the invention may be a rubber elastomer or a thermoplastic elastomer. When using a rubber elastomer, the elastomer may be in a crosslinked form or an uncrosslinked form. As the raw material elastomer, an uncrosslinked form is used when using a rubber elastomer.

In this method of producing a composite material, the step (a) in which the carbon material is dispersed into the elastomer by applying a shear force may be performed by using a method such as an open roll method with a roll interval of 0.5 mm or less, an internal mixing method, or a multi-screw extrusion kneading method.

According to one embodiment of the invention, there is provided a composite material which includes a carbon-based material and a particulate or fibrous metal material Z, wherein:

the carbon-based material has a first bonding structure and a second bonding structure on a surface of a carbon material;

the first bonding structure is a structure in which an element X bonds to a carbon atom of the carbon material;

the second bonding structure is a structure in which an element Y bonds to the element X;

the element X includes at least one element selected from boron, nitrogen, oxygen, and phosphorus;

the element Y includes at least one element selected from magnesium, aluminum, silicon, calcium, titanium, vanadium, chromium, manganese, iron, nickel, copper, zinc, and zirconium; and the metal material Z is aluminum or magnesium.

In this composite materials the first bonding structure may be a structure in which oxygen bonds to a carbon atom of the carbon material; and the second bonding structure may be a structure in which magnesium bonds to oxygen.

According to one embodiment of the invention, there is provided a method of producing a composite metal material, the method comprising:

(d-1) powder forming the composite material obtained by the above-described method of producing the composite material;

(d-2) casting the composite material obtained; or (d-3) causing a molten matrix metal material to permeate the composite material.

Since the element Y adheres to the surface of the carbon-based material of the composite material obtained according to one embodiment of the invention, the surface of the carbon-based material exhibits excellent wettability with the metal material Z as the matrix of the composite metal material. Moreover, a composite metal material in which the carbon-based material is uniformly dispersed in the metal material Z as the matrix can be obtained by the improvement of the wettability of the carbon-based material.

These embodiments of the invention will be described in detail below, with reference to the drawings.

(A) Elastomer

The elastomer preferably has a molecular weight of 5,000 to 5,000,000, and more preferably 20,000 to 3,000,000. If the molecular weight of the elastomer is within this range, since the elastomer molecules are entangled and linked, the elastomer easily enters the space in the aggregated first carbon material (e.g. carbon nanofibers) to exhibit an improved effect of separating the carbon nanofibers. If the molecular weight of the elastomer is less than 5,000, since the elastomer molecules cannot be sufficiently entangled, the effect of dispersing the first carbon material is reduced even if a shear force is applied in the subsequent step. If the molecular weight of the elastomer is greater than 5,000,000, the elastomer becomes too hard so that processing becomes difficult.

A network component of the elastomer in an uncrosslinked form preferably has a spin-spin relaxation time ($T2n/30°$ C.) of 100 to 3,000 μsec, and more preferably 200 to 1,000 μsec, measured at 30° C. by a Hahn-echo method using a pulsed nuclear magnetic resonance (NMR) technique. If the elastomer has a spin-spin relaxation time ($T2n/30°$ C.) within the above range, the elastomer is flexible and has a sufficiently high molecular mobility. Therefore, when miring the elastomer and the first carbon material, the elastomer can easily enter the space in the first carbon material due to high molecular motion. If the spin-spin relaxation time ($T2n/30°$ C.) is shorter than 100 μsec, the elastomer cannot have a sufficient molecular mobility. If the spin-spin relaxation time ($T2N/30°$ C.) is longer than 3,000 μsec, since the elastomer tends to flow as a liquid, it becomes difficult to disperse the first carbon material.

A network component of the elastomer in a crosslinked form preferably has a spin-spin relaxation time ($T2n$) of 100 to 2,000 μsec, measured at 30° C. by a Hahn-echo method using a pulsed nuclear magnetic resonance (NMR) technique. The reasons therefor are the same as those described for the uncrosslinked form. Specifically, when crosslinking an uncrosslinked form which satisfies the above conditions by using the method according to the invention, the spin-spin relaxation time (T2$n$) of the resulting crosslinked form almost falls within the above range.

The spin-spin relaxation time obtained by the Hahn-echo method using the pulsed NMR technique is a measure which indicates the molecular mobility of a substance. In more detail, when measuring the spin-spin relaxation time of the elastomer by the Hahn-echo method using the pulsed NMR technique, a first component having a shorter first spin-spin relaxation time (T2$n$) and a second component having a longer second spin-spin relaxation time (T2$nn$) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboorn-Gill (CPMG) method, or a 90-degree pulse method may be applied instead of the Hahn-echo method. However, since the elastomer according to the invention has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, side chain, and terminal chain of the elastomer includes an unsaturated bond or a group having affinity to the first carbon material, particularly to a terminal radical of the carbon nanofiber, or the elastomer has properties of readily producing such a radical or group. The unsaturated bond or group may be at least one unsaturated bond or group selected from a double bond, a triple bond, and functional groups such as a hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The carbon nanofiber generally has a structure in which the side surface is formed of a six-membered ring of carbon atoms and the end is closed by introduction of a five-membered ring. However, since the carbon nanofiber has a forced structure, a defect tends to occur, so that a radical or a functional group tends to be formed at the defect. In one embodiment of the invention, since at least one of the main chain, side chain, and terminal chain of the elastomer includes an unsaturated bond or a group having high affinity (reactivity or polarity) to the radical of the carbon nanofiber, the elastomer and the carbon nanofiber can be bonded. This enables the carbon nanofibers to be easily dispersed by overcoming the aggregating force of the carbon nanofibers. When mixing the elastomer and the first carbon material such as the carbon nanofibers, fee radicals produced by breakage of the elastomer molecule attack the defects of the carbon nanofibers to produce free radicals on the surfaces of the carbon nanofibers.

As the elastomer, an elastomer such as natural rubber (NR), epoxidized natural rubber (ENR), styrenebutadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), or styrene-based elastomer (SBS); or a mixture of these elastomers may be used. In particular, a highly polar elastomer which readily produces free radicals during mixing of the elastomer, such as natural rubber (NR) or nitrile rubber (NBR), is preferable. An elastomer having a low polarity, such as ethylene propylene rubber (EPDM), may also be used in the invention, since such an elastomer also produces free radicals by setting the mixing temperature at a relatively high temperature (e.g. 50 to 150° C. for EPDM).

In the composite elastomer according to one embodiment of the invention, a crosslinked elastomer, an uncrosslinked elastomer, or a thermoplastic polymer may be directly used as the elastomer material.

(B) First Carbon Material

As the first carbon material, a carbon allotrope material may be used. For example, the first carbon material may be selected from carbon fiber, carbon black, amorphous carbon, graphite, diamond, fullerene, and the like. The carbon fiber used herein includes carbon nanofiber. When using carbon black, since the carbon black is inexpensive and commercially available in many grades, the carbon black can be relatively easily utilized. A nanomaterial such as a minute carbon material (e.g. carbon nanofiber or fullerene) achieves a high reinforcement effect with a small amount of addition.

The amount of the first carbon material to be added may be determined depending on the type and the application of composite material or composite metal material.

As the carbon black used in the invention, carbon black of various grades produced by using various raw materials may be used. The carbon black may be in a state of either elementary particles (primary particles) or an aggregate in which the elementary particles are fused and connected (agglomerate). However, carbon black having a comparatively high structure in which the aggregate is grown is preferable when used as a reinforcement filler.

The carbon black used in the invention has an average elementary particle diameter of preferably 100 nm or less, and still more preferably 50 nm or less. The volume effect and the reinforcing effect are increased as the size of the carbon black particle becomes smaller. In practical application, the average particle diameter is preferably 10 to 30 nm.

The size of the carbon black particle is also indicated by the nitrogen adsorption specific surface area. In this case, the nitrogen adsorption specific surface area is 10 $m^2/g$ or more, and preferably 40 $m^2/g$ or more as the nitrogen adsorption specific surface area ($m^2/g$) measured according to JIS K 6217-2 (2001) "Carbon black for rubber industry—Fundamental characteristics—Part 2: Determination of specific surface area—Nitrogen adsorption methods—Single-point procedures".

The reinforcing effect of the carbon black used in the invention is affected by the degree of structure of the aggregate in which the elementary particles are fused. The reinforcing effect is increased by adjusting the DBP absorption to 50 $cm^3/100$ g or more, and preferably 100 $cm^3/100$ g or more. This is because the aggregate forms a higher structure as the DBP absorption is greater.

As the carbon black used in the invention, carbon black of grades such as SAF-HS (N134, N121), SAF (N110, N115), ISAF-HS (N234), TSAF (N220, N220M), ISAF-LS (N219, N231), ISAF-HS (N285, N229), HAF-HS (N339, N347), HAF (N330), HAF-LS (N326), T-HS (N351, N299), T-NS (N3301), MAF (N550M), FEF (NS550), GPF (N660, N630, N650, N683), SRF-HS-HM (N762, N774), SRFLLM (N760M, N754, N772, N762), FT, HCC, HCF, MCC, MCF, LEF, MFF, RCF, and RCC, and conductive carbon black such as Tokablack, HS-500, acetylene black, and Ketjenblack may be used.

When the first carbon material is carbon fiber, particularly carbon nanofiber, the composite elastomer according to one embodiment of the invention preferably includes the carbon nanofibers in an amount of 0.01 to 50 wt %.

The carbon nanofibers preferably have an average diameter of 0.5 to 500 nm. In order to increase the strength of the composite elastomer, the average diameter of the carbon nanofibers is still more preferably 0.5 to 30 nm. The carbon nanofiber may be either a linear fiber or a curved fiber.

As examples of the carbon nanofiber, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of the single-layer structure or the multi-layer structure, or may have the single-layer structure and the multi-layer structure in combination. A carbon material having a partial carbon nanotube structure may also be used. The carbon nanotube may be called a graphite fibril nanotube.

A single-layer carbon nanotube or a multi-layer carbon nanotube is produced to a desired size by using an arc discharge method, a laser ablation method, a vapor-phase growth method, or the like.

In the arc discharge method, an arc is discharged between electrode materials made of carbon rods in an argon or hydrogen atmosphere at a pressure slightly lower than atmospheric pressure to obtain a multi-layer carbon nanotube deposited on the cathode. When a catalyst such as nickel/cobalt is mixed into the carbon rod and an arc is discharged, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The first carbon material may be provided with improved adhesion to and wettability with the elastomer by subjecting the carbon nanofibers to a surface treatment such as an ion-injection treatment, sputter-etching treatment, or plasma treatment before mixing the carbon nanofibers into the elastomer.

(C) Element Y

The element Y bonds to the surface of the second carbon material to improve the wettability between the carbon-based material and the matrix metal material. A carbon material generally exhibits poor wettability with a metal material such as aluminum and magnesium. However, wettability is improved by using the carbon-based material having the element Y on the surface. A particulate substance including the element Y may be mixed and dispersed in the elastomer in advance in the step (a) so that the first carbon material is more favorably dispersed when mixing the first carbon material into the elastomer. In the step (a), the substance including the element Y may be mixed into the elastomer before mixing the first carbon material, or may be mixed into the elastomer together with the first carbon material.

The substance including the element Y preferably has an average particle diameter greater than the average diameter of the first carbon material used. The average particle diameter of the substance including the element Y is 500 μm or less, and preferably 1 to 300 μm. The shape of the substance including the element Y is not limited to spherical. The substance including the element Y may be in the shape of a sheet or scale insofar as turbulent flows occur around the substance including the element Y during mixing.

The substance including the element Y preferably has a melting point lower than the melting point of the first carbon material and lower than the melting point of the metal material Z. If the melting point of the substance including the element Y satisfies the above condition, the substance including the element Y can be vaporized by the heat treatment in the step (c) without damaging the first carbon material and the metal material Z. When the metal material Z as the matrix metal contains aluminum or magnesium, the element Y preferably includes at least one element selected from magnesium aluminum, silicon, calcium, titanium, vanadium, chromium, manganese, iron, nickel, copper, zinc, and zirconium. Therefore, the substance including the element Y may include at least one element Y selected from these elements. These elements are used as elements which form an aluminum alloy or a magnesium alloy. These elements easily bond to aluminum or magnesium, and can stably exist in a state in which the elements bond to aluminum or magnesium. As the element Y, magnesium, zinc, or aluminum, which exhibits particularly excellent bonding properties with magnesium or aluminum as the matrix metal material, may be used.

In particular, when oxygen bonds to the surface of the first carbon material as the element X, it is preferable to use magnesium as the element Y since magnesium easily bonds to oxygen. Therefore, the carbon-based material thus obtained has a first bonding structure and a second bonding structure on the surface of the carbon material, the first bonding structure being a structure in which the element X bonds to the carbon atom of the carbon material and the second bonding structure being a structure in which the element Y bonds to the element X. In particular, when the first bonding structure is a structure in which oxygen bonds to the carbon atom of the carbon material, it is preferable that the second bonding structure be a structure in which magnesium bonds to oxygen.

The above description illustrates the case of mixing the substance including the element Y into the elastomer in the step (a). However, the invention is not limited thereto. It suffices that the substance including the element Y be subjected to the heat treatment in the step (c) together with the second carbon material. For example, the substance including the element Y may be disposed in a heat treatment furnace together with the second carbon material and vaporized by the heat treatment in the step (c) In this case, the substance including the element Y may not be particulate.

In the invention, magnesium or aluminum used as the matrix material includes an alloy containing magnesium or aluminum as the major component.

(D) Metal Material Z

The metal material Z forms a composite material together with the carbon-based material, and prevents aggregation of the carbon-based material. The metal material Z may be used as a metal material as a matrix when producing a composite metal material.

The metal material Z may be particulate or fibrous. When using a particulate metal material Z, the first carbon material can be more favorably dispersed in the elastomer when mixing the first carbon material into the elastomer by mixing the metal material Z into the elastomer in the step (a). In the step (a), the metal material Z may be mixed into the elastomer before mixing the first carbon material, or may be mixed into the elastomer together with the first carbon material.

A particulate metal material Z mixed into the elastomer in the step (a) preferably has an average particle diameter greater than the average diameter of the first carbon material used. The average particle diameter of the metal material Z is 500 μm or less, and preferably 1 to 300 μm. The shape of the metal material Z is not limited to spherical. The metal material Z may be in the shape of a sheet or a scale insofar as turbulent flows occur around the metal material Z during mixing.

The metal material Z is preferably a metal having a melting point lower than the melting point of the first carbon material and higher than the melting point of the substance including the element Y. The metal material Z is still more preferably a light metal having a melting point of 800° C. or less and having an atomic weight of 100 or less. As examples of the metal material Z, magnesium, aluminum, and the like can be given. In the invention, magnesium or aluminum used as the metal material Z includes an alloy containing magnesium or aluminum as the major component.

(E) Step (a) of Mixing at Least the First Carbon Material and the Metal Material Z Into the Elastomer and Dispersing the First Carbon Material and the Metal Material Z by Applying Shear Force to Obtain the Composite Elastomer The step (a) may be performed by using a method such as an open roll method, an internal mixing method, or a multi-screw extrusion kneading method.

In one embodiment of the invention, an example using an open-roll method with a roll distance of 0.5 mm or less is described below as the step of mixing the substance including the element Y, the metal material Z, and the first carbon material into the elastomer.

FIG. 1 is a diagram schematically showing the open-roll method using two rolls. In FIG. 1, a reference numeral 10 indicates a first roll, and a reference numeral 20 indicates a second roll. The first roll 10 and the second roll 20 are disposed at a predetermined distance d of preferably 1.0 mm or less, and still more preferably 0.1 to 0.5 mm. The first and second rolls are rotated normally or reversely. In the example shown in FIG. 1, the first roll 10 and the second roll 20 are rotated in the directions indicated by the arrows. When the surface velocity of the first roll 10 is indicated by V1 and the surface velocity of the second roll 20 is indicated by V2, the surface velocity ratio (V1/V2) of the first roll 10 to the second roll 20 is preferably 1.05 to 3.00, and still more preferably 1.05 to 1.2. A desired shear force can be obtained by using such a surface velocity ratio. When causing an elastomer 30 to be wound around the second roll 20 while rotating the first and second rolls 10 and 20, a bank 32 of the elastomer is formed between the rolls 10 and 20. After the addition of a substance 41 including the element Y and a metal material Z 42 to the bank 32, the elastomer 30, the substance including the element Y, and the metal material Z 42 are mixed by rotating the first and second rolls 10 and 20. After the addition of a first carbon material 40 to the bank 32 in which the elastomer 30, the substance 41 including the element Y, and the metal material Z 42 are mixed, the first and second rolls 10 and 20 are rotated. After reducing the distance between the first and second rolls 10 and 20 to the distance d, the first and second rolls 10 and 20 are rotated at a predetermined surface velocity ratio. This causes a high shear force to be applied to the elastomer 30, whereby the aggregated first carbon material is separated by the shear force so that portions of the first carbon material are removed one by one and become dispersed in the elastomer 30. When the substance 41 including the element Y and the metal material Z 42 are particulate, the shear force caused by the rolls causes turbulent flows to occur around the substance 41 including the element Y and the metal material Z 42 dispersed in the elastomer. These complicated flows cause the carbon material to be further dispersed in the elastomer 30. If the elastomer 30 and the first carbon material 40 are mixed before mixing the substance 41 including the element Y and the metal material Z 42, since the movement of the elastomer 30 is restrained by the first carbon material 40, it becomes difficult to mix the substance including the element Y. Therefore, it is preferable to mix the substance 41 including the element Y and the metal material Z 42 before adding the first carbon material 40 to the elastomer 30.

In the step (a), free radicals are produced in the elastomer shorn by the shear force and attack the surface of the first carbon material, whereby the surface of the first carbon material is activated. When using natural rubber (NR) as the elastomer, the natural rubber (NR) molecule is cut while being mixed by the rolls to have a molecular weight lower than the molecular weight before being supplied to the open rolls. Since radicals are produced in the cut natural rubber (NR) molecule and attack the surface of the first carbon material during mixing, the surface of the first carbon material is activated.

In the step (a), the elastomer and the first carbon material are mixed at a comparatively low temperature of preferably 0 to 50° C., and still more preferably 5 to 30° C. in order to obtain as high a shear force as possible. When using the open-roll method, it is preferable to set the roll temperature at the above-mentioned temperature. The distance d between the first and second rolls 10 and 20 is set to be greater than the average particle diameter of the substance 41 including the element Y and the metal material Z 42 even when the distance is minimized. This enables the first carbon material 40 to be uniformly dispersed in the elastomer 30.

Since the elastomer according to one embodiment of the invention has the above-described characteristics, specifically, the above-described molecular configuration (molecular length), molecular motion, and chemical interaction with the first carbon material, dispersion of the first carbon material is facilitated. Therefore, a composite elastomer exhibiting excellent dispersibility and dispersion stability (first carbon material rarely reaggregates) can be obtained. In more detail, when mixing the elastomer and the first carbon material, the elastomer having an appropriately long molecular length and a high molecular mobility enters the space in the first carbon material, and a specific portion of the elastomer bonds to a highly active site of the first carbon material through chemical interaction. When a high shear force is applied to the mixture of the elastomer and the first carbon material in this state, the first carbon material moves accompanying the movement of the elastomer, whereby the aggregated first carbon material is separated and dispersed in the elastomer. The dispersed first carbon material is prevented from reaggregating due to chemical interaction with the elastomer, whereby excellent dispersion stability can be obtained.

Moreover, since predetermined amounts of the substance including the element Y and the metal material Z are included in the elastomer, a shear force is also applied in the direction in which the first carbon material is separated due to a number of complicated flows such as turbulent flows of the elastomer occurring around the substance including the element Y and the material material Z. Therefore, even carbon nanofibers with a diameter of about 30 nm or less or carbon nanofibers in the shape of a curved fiber move in the flow direction of each elastomer molecule bonded to the carbon nanofibers due to chemical interaction, whereby the carbon nanofibers are uniformly dispersed in the elastomer.

In the step of dispersing the first carbon material in the elastomer by applying a shear force, the above-mentioned internal mixing method or multi-screw extrusion kneading method may be used instead of the open-roll method. In other words, it suffices that this step apply a shear force to the elastomer sufficient to separate the aggregated first carbon material and produce radicals in the elastomer molecules.

A composite elastomer obtained by the step of mixing and dispersing the substance including the element Y, the metal material Z, and the first carbon material in the elastomer (mixing and dispersing step) may be crosslinked by using a crosslinking agent and formed thereafter, or may be formed without crosslinking the composite elastomer. As the forming method, a compression forming process, an extrusion forming process, or the like may be used. The compression forming process includes forming the composite elastomer, in which the substance including the element Y, the metal material Z, and the first carbon material are dispersed, in a pressurized state for a predetermined time (e.g. 20 min) in a forming die having a desired shape and set at a predetermined temperature (e.g. 175° C.).

In the mixing and dispersing step of the elastomer and the first carbon material, or in the subsequent step, a compounding ingredient usually used in the processing of an elastomer such as rubber may be added. As the compounding ingredient, a known compounding ingredient may be used. As examples of the compounding ingredient, a crosslinking agent, vulcanizing agent, vulcanization accelerator, vulcanization retarder, softener, plasticizer, curing agent, reinforcing agent, filler, aging preventive, colorant, and the like can be given.

(F) Composite Elastomer Obtained by Above-described Method

In the composite elastomer according to one embodiment of the invention, the first carbon material is uniformly dispersed in the elastomer as a matrix. In other words, the elastomer is restrained by the first carbon material. The mobility of the elastomer molecules restrained by the first carbon material is small in comparison with the case where the elastomer molecules are not restrained by the first carbon material, Therefore, the first spin-spin relaxation time (T2$n$), the second spin-spin relaxation time (T2$nn$), and the spin-lattice relaxation time (T1) of the carbon fiber composite material according to one embodiment of the invention are shorter than those of the elastomer which does not include the first carbon material. In particular, when mixing the first carbon material into the elastomer containing the substance including the element Y and the metal material Z, the second spin-spin relaxation time (T2$nn$) becomes shorter than that of the elastomer containing only the first carbon material. The spin-lattice relaxation time (T1) of the crosslinked form changes in proportion to the amount of the first carbon material mixed.

In a state in which the elastomer molecules are restrained by the first carbon material, the number of non-network components (non-reticulate chain components) is considered to be reduced for the following reasons. Specifically, when the molecular mobility of the elastomer is entirely decreased by the first carbon material, since the number of non-network components which cannot easily move is increased, the non-network components tend to behave in the same manner as the network components. Moreover, since the non-network components (terminal chains) easily move, the non-network components tend to be adsorbed on the active sites of the first carbon material. It is considered that these phenomena decrease the number of non-network components. Therefore, the fraction (fnn) of components having the second spin-spin relaxation time is smaller than that of an elastomer which does not contain the first carbon material. In particular, when mixing the first carbon material into the elastomer containing the substance including the element Y, the fraction (fnn) of components having the second spin-spin relaxation time is further reduced in comparison with an elastomer containing only the first carbon material.

Therefore, the composite elastomer according to one embodiment of the invention preferably has values measured by the Hahn-echo method using the pulsed NMR technique within the following range.

Specifically, it is preferable that, in the uncrosslinked form, the first spin-spin relaxation time (T2$n$) measured at 150° C. be 100 to 3,000 μsec, the second spin-spin relaxation time (T2$nn$) measured at 150° C. be absent or 1,000 to 10,000 μsec, and the fraction (fnn) of components having the second spin-spin relaxation time be less than 0.2.

The spin-lattice relaxation time (T1) measured by the Hahn-echo method using the pulsed NMR technique is a measure which indicates the molecular mobility of a substance in the same manner as the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer.

The composite elastomer according to one embodiment of the invention preferably has a flow temperature, determined by temperature dependence measurement of dynamic viscoelasticity, 20° C. or more higher than the flow temperature of the raw material elastomer. In the composite elastomer according to one embodiment of the invention, the substance including the element Y, the metal material Z, and the first carbon material are uniformly dispersed in the elastomer. In other words, the elastomer is restrained by the first carbon material as described above. In this state, the elastomer exhibits molecular motion smaller than that of an elastomer which does not include the fast carbon material, whereby flowability is deceased. The composite elastomer according to one embodiment of the invention having such flow temperature characteristics shows a small temperature dependence of dynamic viscoelasticity to exhibit excellent thermal resistance.

(G) Step (b) of Heat-treating Composite Elastomer to Produce Intermediate Composite Material Including Second Carbon Material and Metal Material Z The intermediate composite material in which the second carbon material is dispersed around the metal material Z can be produced by the step (b) of heat-treating the composite elastomer to vaporize the elastomer included in the composite elastomer.

The heat treatment conditions may be arbitrarily selected depending on the type of elastomer used. The heat treatment temperature is set at a point equal to or higher than the vaporization temperature of the elastomer and lower than the vaporization temperatures of the first carbon material and the metal material Z. When mixing the substance including the element Y in advance in the step (a), the heat treatment temperature is set at a point lower than the vaporization temperature of the substance including the element Y.

The step (b) may be performed in the presence of the substance including the element X so that the second carbon material in which the element X bonds to the carbon atom of the first carbon material can be obtained. For example, the composite elastomer may include the substance including the element X, and the element X may be caused to bond to the carbon atom of the first carbon material by the heat treatment in the step (b). Or, the step (b) may be performed in an atmosphere containing the substance including the element X so that the element X is caused to bond to the carbon atom of the first carbon material, for example.

The element X is an element which easily bonds to carbon via a covalent bond and is a light element with a valence of preferably two or more. For example, the element X may include at least one element selected from boron, nitrogen, oxygen, and phosphorus. The element X is preferably oxygen. Since oxygen is present in air, oxygen can be easily used for the heat treatment of the step (b). Moreover, oxygen easily reacts with the activated first carbon material such as a radical of carbon nanofiber. Therefore, it is preferable to use oxygen as the element X. Moreover, since oxygen easily bonds to a metal material or a semimetal material such as magnesium, the second carbon material to which oxygen bonds can easily bond to the element Y.

When using oxygen as the element X oxygen may be mixed into the is atmosphere used for the heat treatment in the step (b). When using nitrogen as the element X, the step (b) may be carried out in an atmosphere containing ammonium gas as the substance including the element X. When using boron, phosphorus, or the like as the element X, the element or a compound of the element may be mixed into the elastomer before the step (b). In this case, the substance including the element X may be mixed during mixing in the step (a), for example.

In the step (b) according to one embodiment of the invention, the composite elastomer obtained by the step (a) is disposed in a heat treatment furnace, and the atmosphere inside the furnace is heated to the vaporization temperature of the elastomer (e.g. 500° C.). The elastomer is vaporized by heating and the surface of the first carbon material activated by the step (a) bonds to the element X contained in the atmosphere inside the furnace or included in the elastomer, whereby the surface-treated second carbon material is produced. Since the surface of the second carbon material has been activated by free radicals of the elastomer molecules shorn by the step (a), the surface of the carbon material can easily bond to oxygen present in the atmosphere inside the furnace, for example. Since the surface of the second carbon material thus obtained has been oxidized and activated, the second carbon material easily bonds to the element Y. In addition, since the surface of the second carbon material has been activated by the reaction with the radicals of the elastomer, the surface of the second carbon material easily bonds to the element Y even if the element X is not used.

(H) Step (c) of Heat-treating Intermediate Composite Material Together With Substance Including Element Y to Vaporize Substance Including Element Y The composite material including the carbon-based material according to the invention and the metal material Z can be produced by the step (c) of heat-treating the intermediate composite material obtained by the step (b) together with the particulate or fibrous metal material Z having a melting point lower than the melting point of the first carbon material and the substance including the element Y having a melting point lower than the melting point of the metal material Z to vaporize the substance including the element Y.

The heat treatment temperature in the step (c) is set at a point higher than the heat treatment temperature in the step (b), equal to or higher than the vaporization temperature of the substance including the element Y, and lower than the vaporization temperatures of the metal material Z and the first carbon material. The heat treatment in the step (c) may be performed at the same time as the step (b) by setting the heat treatment temperature in the step (b) at a point equal to or higher than the vaporization temperature of the substance including the element Y, or the step (b) may be performed in the process of increasing the temperature from room temperature to the heat treatment temperature in the step (c).

When the second carbon material obtained by the step (b) and the substance including the element Y are heated to a temperature equal to or higher than the vaporization temperature of the substance including the element Y in a heat treatment furnace, the substance including the element Y is vaporized so that the element Y bonds to the surface of the second carbon material or the element Y bonds to the element X bonded to the surface of the second carbon material to obtain a carbon-based material according to the invention.

The substance including the element Y may be mixed into the composite elastomer in advance by mixing the substance including the element Y and the elastomer in the step (a) as stated above, or may not be mixed into the composite elastomer. When the substance including the element Y is not mixed into the composite elastomer in advance, the substance including the element Y may be disposed in the heat treatment furnace in the step (c) together with the second carbon material, or may be vaporized and supplied to the heat treatment furnace. The substance including the element Y vaporized by the heat treatment bonds to the element X bonded to the surface of the second carbon material. In the step (c), a desired carbon-based material can be obtained by disposing the second carbon material in the presence of the substance including the element Y which has been vaporized.

When mixing the metal material Z into the elastomer in the step (a) as stated above, since the metal material Z is dispersed in the composite elastomer together with the first carbon material, the metal material Z and the carbon-based material are uniformly dispersed in the composite material obtained by the heat-treatment in the steps (b) and (c). The composite material thus obtained prevents reaggregation of the carbon-based material due to the presence of the metal material Z.

The vaporized substance including the element Y easily bonds to the element X present on the surface of the second carbon material so that a compound of the element X and the element Y is produced. The element X prevents direct bonding between the element Y and the first carbon material. For example, when the element Y is aluminum, if the first carbon material directly bonds to aluminum, a substance which easily reacts with water, such as $Al_4C_3$, is produced. Therefore it is preferable to perform the step (b) of causing the element X to bond to the surface of the first carbon material before the step (c) of vaporizing the substance including the element Y.

In the carbon-based material thus obtained, the surface of the first carbon material (e.g. carbon nanofiber) has a structure in which the carbon atom of the carbon nanofiber bonds to the element X and the element X bonds to the element Y. Therefore, the carbon-based material has a structure in which the surface of the first carbon material (e.g. carbon nanofiber) is covered with the compound layer (e.g. oxide layer) of carbon and the element X and is also covered with the reaction product layer of the element X and the element Y (e.g. magnesium). The surface structure of the carbon-based material may be analyzed by X-ray photoelectron spectroscopy (XPS) or energy dispersive spectrum (EDS) analysis.

(I) Step (d) of Obtaining Composite Metal Material by Using Composite Material

In the step (d) according to one embodiment of the invention, (d-1) a step of powder forming the composite material, (d-2) a step of casting the composite material, or (d-3) a step of causing a molten matrix metal material to permeate the composite material way be employed.

(d-1) Powder Forming Method

The powder forming step of the composite material according to one embodiment of the invention may be performed by powder forming the composite material obtained by the step (c). In more detail, the composite material obtained according to the above-described embodiment is compressed in a die either directly or after mixing with a matrix metal material formed of the same metal as the metal material Z, and sintered at the sintering temperature of the metal material Z (e.g. 550° C. when the metal material Z is aluminum) to obtain a composite metal material.

The powder forming according to one embodiment of the invention is the same as powder forming in a metal forming process and involves powder metallurgy. The powder forming according to one embodiment of the invention not only includes the case of using a powder raw material, but also includes the case of using a raw material formed in the shape of a block by compression-performing the composite material. As the powder forming method, a general sintering method, a spark plasma sintering (SPS) method using a plasma sintering device, or the like may be employed.

The composite material and the particles of the matrix metal material may be mixed by dry blending, wet blending, or the like. When using wet blending, it is preferable to mix (wet-blend) the matrix metal material with the powder of the composite material in a solvent. Therefore, since the composite material which is ground to powder such as particles or fibers can be used when dry blending or wet blending the composite material, the composite material is easily utilized for metalworking.

The composite metal material produced by such powder forming is obtained in a state in which the carbon-based material is dispersed in the matrix metal material (metal material Z). In particular, since the metal material Z and the carbon-based material have been uniformly dispersed in stage of the composite material, a homogenous composite metal material can be obtained by directly powder forming the composite material. When further adding a matrix metal material to the composite material, a composite metal material having desired properties can be produced by adjusting the mixing ratio of the composite material to the matrix metal material.

(d-2) Casting Method

The casting step of the composite material may be performed by casting the composite material obtained according to the above-described embodiment in a die having a desired shape either directly or after mixing the composite material into a molten matrix metal material (e.g. metal material Z). In the casting step, a metal mold casting method, a diecasting method, or a low-pressure casting method, in which a molten metal is poured into a die made of steel, may be employed. A method classified into a special casting method, such as a high-pressure casting method in which a molten metal is caused to solidify at a high pressure, a thixocasting method in which a molten metal is stirred, or a centrifugal casting method in which a molten metal is cast into a die by utilizing centrifugal force, may also be employed. In these casting methods, the molten matrix metal material is caused to solidify in a die in a state in which the carbon-based material is mixed into the molten matrix metal material to form a composite metal material.

If the molten matrix metal material used in the casting step is the same metal as the metal material Z, the wettability with the metal material Z is improved, whereby the strength of the composite metal material as the product can be increased.

(d-3) Permeation Method

In one embodiment of the invention, a casting step using a pressureless permeation method which causes a molten metal to permeate the composite material is described below in detail with reference to FIGS. 2 and 3.

Figure 2:
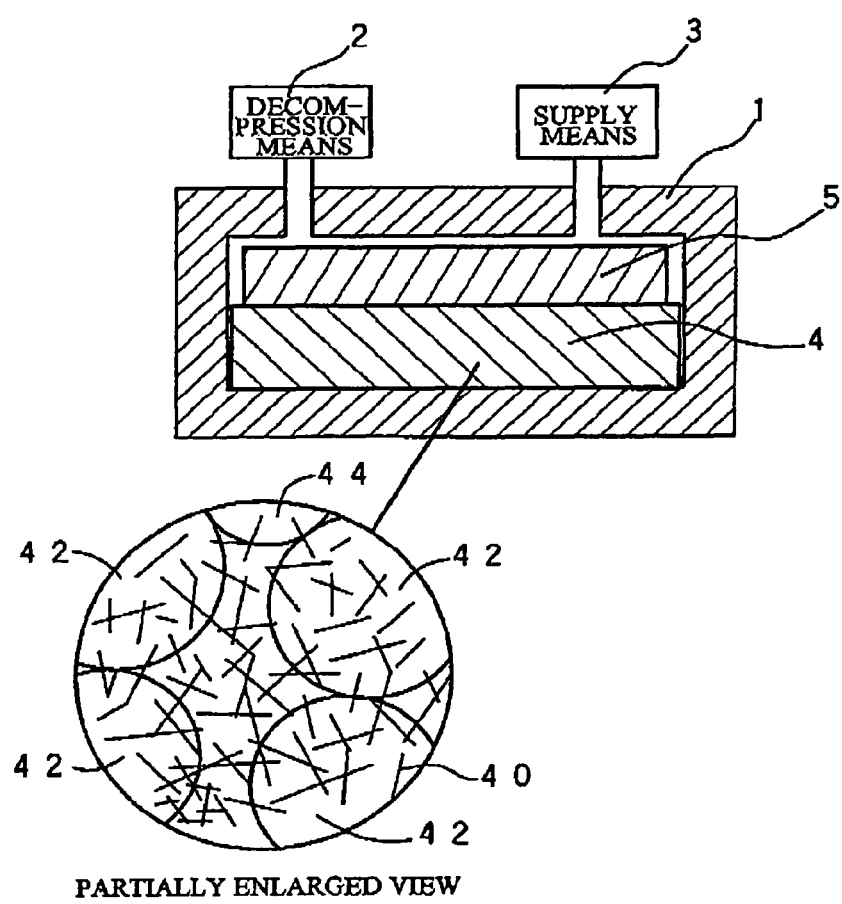
FIG. 2 is a schematic configuration diagram of a device for producing a composite material by using a pressureless permeation method.
Figure 3:
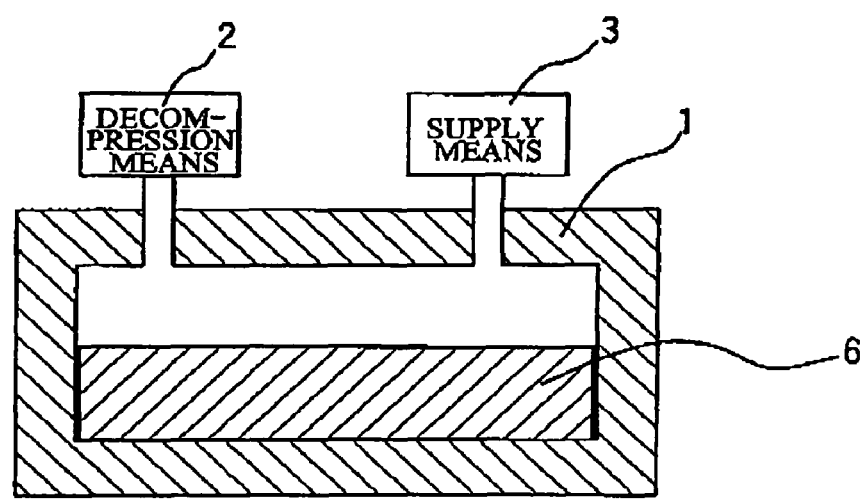
FIG. 3 is a schematic configuration diagram of a device for producing a composite material by using a pressureless permeation method.

FIGS. 2 and 3 are schematic configuration diagrams of a device for producing the composite metal material by using the pressureless permeation method. As the metal material obtained according to the above-described embodiment, a composite material 4, which is further mixed with magnesium particles 44 as a reducing agent and compression formed in a forming die having the shape of the final product, may be used. In FIG. 2, the composite material 4 (e.g. composite material using carbon nanofibers as first carbon material 40) formed in advance is placed in a sealed container 1. An ingot of a matrix metal material formed of the same metal as the metal material Z, such as an aluminum ingot 5, is disposed on the composite material 4. The composite material 4 and the aluminum ingot 5 disposed in the container 1 are heated to a temperature equal to or higher than the melting point of aluminum by using heating means (not shown) provided in the container 1. The heated aluminum ingot 5 is melted to form molten aluminum (molten metal). The molten aluminum permeates the space in the composite material 4.

The composite material 4 according to one embodiment of the invention is formed to have a space which allows the molten aluminum to rapidly permeate the entire composite material 4 by a capillary phenomenon when compression-performing the composite material 4. If the composite material 4 maintains a certain shape, the composite material 4 may not be compression-preformed. The atmosphere inside the container 1 may be replaced with a reducing atmosphere by mixing a small amount of magnesium particles 44 with the particulate composite material 4 before compression-preforming as in one embodiment of the invention. The molten aluminum permeates the space between the aluminum particles 42 reduced and provided with improved wettability due to the capillary phenomenon, whereby the composite material 4 is completely filled with the molten aluminum. Then, heating using the heating means of the container 1 is terminated so that the molten metal which has permeated the composite material 4 is allowed to cool and solidify to obtain a composite metal material 6, as shown in FIG. 3, in which the carbon-based material is uniformly dispersed. Since the material for the metal material Z of the composite material 4 is the same as the material for the molten metal as the matrix to ensure easy bonding, the resulting composite metal material is homogeneous over the entire composite metal material.

The atmosphere inside the container 1 may be removed by decompression means 2 such as a vacuum pump connected with the container 1 before heating the container 1. Nitrogen gas may be introduced into the container 1 from inert-gas supply means 3 such as a nitrogen gas cylinder connected with the container 1.

In one embodiment of the invention, the composite material compression-preformed into a desired shape in advance is used. However, the permeation method may be performed by placing the composite material which is ground to particles in a die having a desired shape, and placing an ingot of another composite material on the composite material.

The above-described embodiment illustrates the pressureless permeation method. However, a pressure permeation method which applies pressure by utilizing the pressure of an atmosphere such as an inert gas may also be used, for example.

As described above, since the element Y bonds to the surface of the carbon-based material in the composite material, the sure of the carbon-based material has improved wettability with the matrix metal material (metal material Z). Since the surface of the carbon-based material has sufficient wettability with the molten matrix metal material (metal material Z), a homogenous composite metal material of which the variation in the mechanical properties is decreased over the entire material is obtained.

Examples according to the invention are described below. However, the invention is not limited to the following examples.

Examples 1 to 3 and Comparative Examples 1 and 2

(1) Preparation of Sample (a) Preparation of Uncrosslinked Sample (Composite Elastomer)

Step 1: Open rolls with a roll diameter of six inches (roll temperature: 10 to 20° C.) were provided with a predetermined amount (100 g) of a polymer substance (100 parts by weight (phr)) shown in Table 1, and the polymer substance was wound around the roll.

Step 2: A substance including the element Y and a metal material Z were added to the polymer substance in amounts (parts by weight) shown in Table 1. The roll distance was set at 1.5 mm. The types of the substance including the element Y and the metal material Z added are described later.

Step 3: A first carbon material ("CNT" in Table 1) was added to the polymer substance containing the substance including the element Y and the metal material Z in an amount (parts by weight) shown in Table 1. The roll distance was set at 1.5 mm.

Step 4: After the addition of the first carbon material, the mixture of the polymer substance and the first carbon material was removed from the rolls.

Step 5: After reducing the roll distance from 1.5 mm to 0.3 mm, the mixture was supplied and tight milled. The surface velocity ratio of the two rolls was set at 1.1. The tight milling was repeatedly performed ten times.

Step 6: After setting the rolls at a predetermined distance (1.1 mm), the mixture subjected to tight milling was supplied and sheeted.

Uncrosslinked samples of composite elastomers of Examples 1 to 3 were thus obtained.

As the polymer substance in Examples 1 to 3, natural rubber (NR) with an average molecular weight of 3,000,000 was used. In Examples 1 to 3, magnesium particles (average particle diameter: 50 µm) were used as the substance including the element Y, and pure aluminum (aluminum: 99.17%) particles (average particle diameter 50 µm) were used as the metal material Z. As the first carbon material in Examples 1 to 3 and the carbon material in Comparative Example 2, carbon nanofibers (CNT) having a diameter (fiber diameter) of about 10 to 20 nm we used.

(b) Preparation of Intermediate Composite Material and Composite Material

The uncrosslinked sample (composite elastomer) obtained by (a) in each of Examples 1 to 3 was heat-treated for two hours in a heat treatment furnace having a nitrogen atmosphere containing a small amount of oxygen (substance including the element X) at a temperature equal to or higher than the vaporization temperature of the elastomer and equal to or higher than the vaporization temperature (500° C.) of the substance including the element Y (magnesium) to vaporize and oxidize the elastomer to obtain an intermediate composite material containing a second carbon material and aluminum particles, and vaporize the substance including the element Y (magnesium) to obtain a composite material. The oxidation reaction was carried out by utilizing oxygen molecules obtained from a small amount of oxygen and vapor contained in the nitrogen atmosphere inside the furnace and a small amount of oxygen and water contained in the elastomer. The vaporized substance including the element Y bonded to oxygen on the surface of the second carbon material.

(c) Preparation of Composite Metal Material

The composite material obtained by (b) in each of Examples 1 to 3 was dry-blended with magnesium particles. The resulting mixture was compression-formed to dimensions of 30×40×20 mm. After placing an aluminum ingot (metal) on the formed product, the formed product and the aluminum ingot were disposed in a container (furnace) containing an inert gas (nitrogen) atmosphere and heated to 750° C. The magnesium particles vaporized and the aluminum ingot melted to become molten aluminum, and the molten metal permeated the space in the compression-formed composite material. After completion of permeation of the molten aluminum, the molten aluminum was allowed to cool and solidify to obtain a composite metal material.

As Comparative Example 1, a pure aluminum (aluminum: 99.17%) ingot was used. As Comparative Example 2, a composite metal material, obtained by dry-blending carbon nanofibers (which were not surface-treated) having a diameter (fiber diameter) of about 10 to 20 nm with pure aluminum (aluminum: 99.17%) and sintering the mixture, was used. The magnesium particles mixed when preparing the composite metal material served as a reducing agent at the end of the molten aluminum.

The carbon nanofiber content of the composite metal materials of Examples 1, 2, and 3 was respectively 0.4 vol %, 1.6 vol %, and 3.2 vol %.

(2) XPS Analysis of Composite Material

Figure 4:
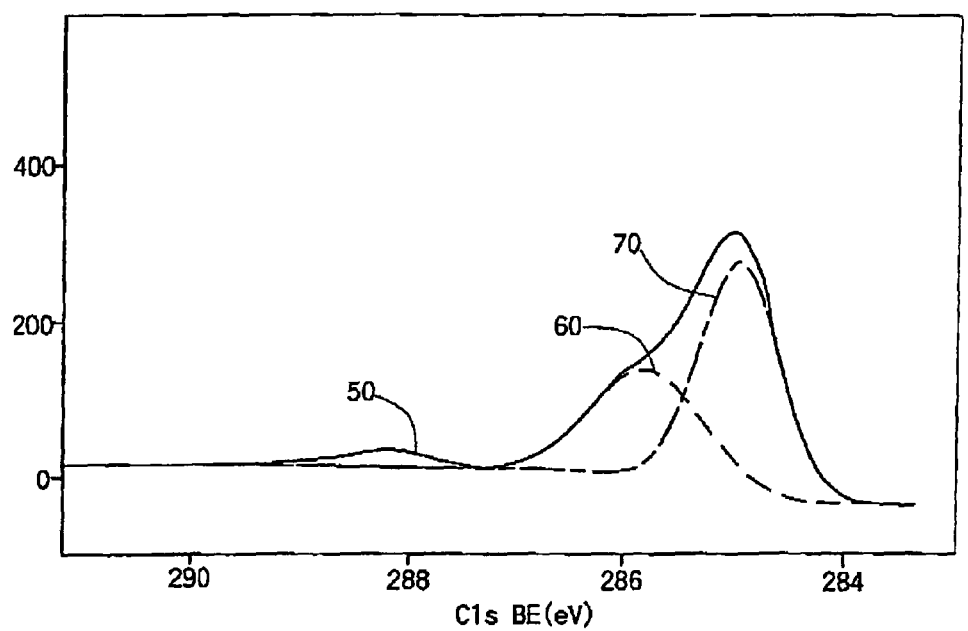
FIG. 4 is a schematic diagram showing XPS data on a carbon-based material obtained in an example according to the invention.

Table 1 shows XPS analysis results of the carbon-based materials in the composite materials obtained by (c) in Examples 1 to 3. In Table 1, the case where the presence of a carbon-oxygen bond was confirmed on the surface of the first carbon material in the carbon-based material is indicated as "surface oxidation", and the case where the presence of a carbon-oxygen bond was not confirmed is indicated as "none". FIG. 4 shows a schematic diagram of XPS data on the carbon-based material of Example 2. A first line segment 50 indicates a double bond "C=O", a second line segment 60 indicates a single bond "C—O", and a third line segment 70 indicates a carbon-carbon bond.

(3) EDS Analysis of Carbon-based Material

Figure 5:
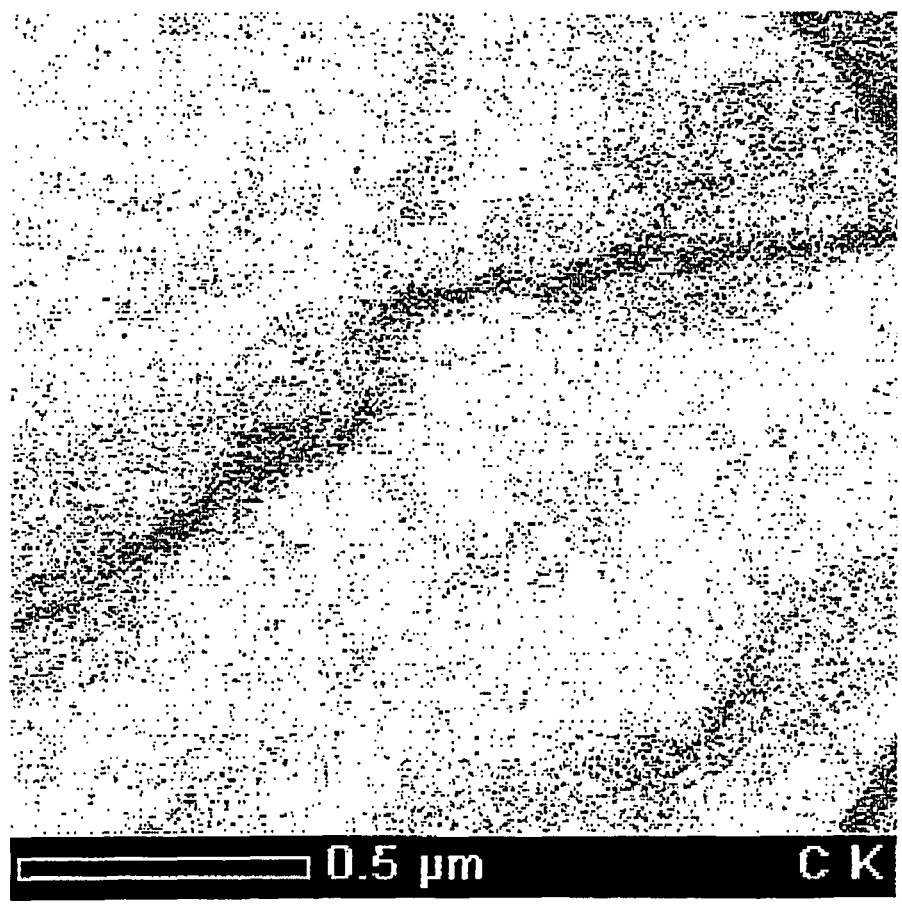
FIG. 5 shows EDS data (carbon) on a composite material obtained in an example according to the invention.
Figure 6:
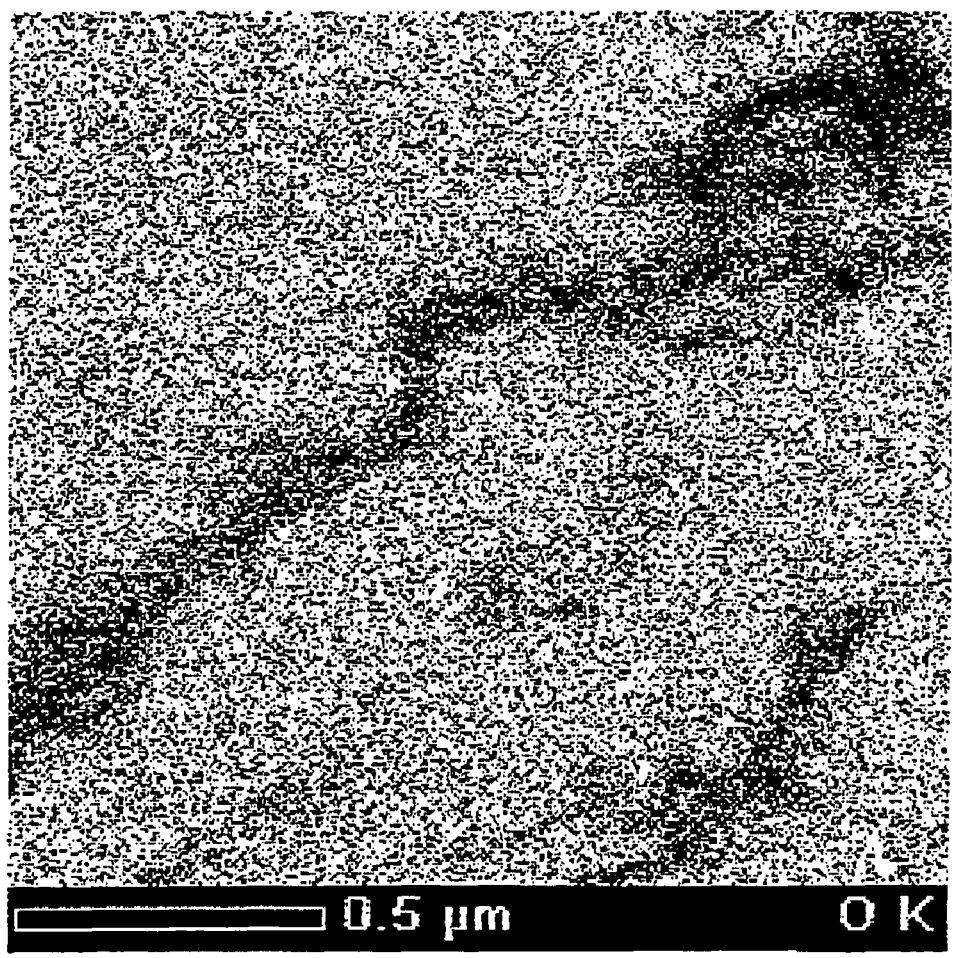
FIG. 6 shows EDS data (oxygen) on a composite material obtained in an example according to the invention.
Figure 7:
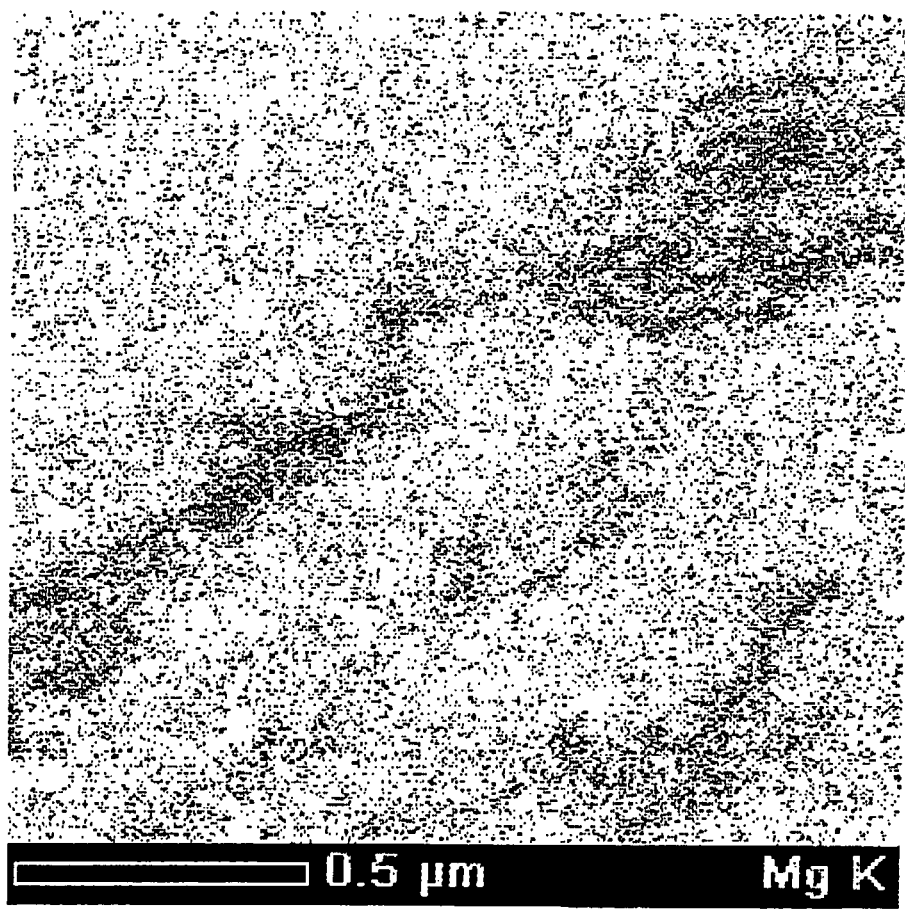
FIG. 7 shows EDS data (magnesium) on a composite material obtained in an example according to the invention.

Table 1 shows XPS analysis results of the composite metal materials obtained by (d) in Examples 1 to 3. In Table 1, the case when the presence of magnesium was confirmed around the carbon-based material is indicated as "Mg", and the case where the presence of magnesium was not confirmed is indicated as "none". FIGS. 5, 6, and 7 show EPS data on the carbon-based material of Example 2. FIGS. 5 to 7 show image data obtained by the EDS analysis. Since the presence or absence of elements is unclear in the black-and-white image, negative-positive inversion processing was performed. The black area in FIG. 5 indicates the presence of carbon, that is, the carbon nanofiber used as the first carbon material. The black area in FIG. 6 indicates the presence of oxygen. The black (dark) area in FIG. 7 indicates the presence of magnesium.

(4) Measurement of Compressive Yield Strength

A 10×10 mm sample with a thickness of 5 mm was prepared from each of the composite metal materials obtained by (c) in Examples 1 to 3 and Comparative Example 2 and aluminum of Comparative Example 1. The 0.2% yield strength (s0.2) when compressing the sample at 0.01 mm/min was measured. The maximum value, minimum value, and mean value (MPa) of the compressive yield strength were determined. The results are shown in Table 1.

1 to 3 was about ±10% Therefore, it was found that a homogeneous composite material of which the variation in mechanical properties was reduced over the entire material was obtained. As a result of scanning electron microscopic observation of the composite metal materials of Examples 1 to 3 and Comparative Example 2, it was found that the dispersibility of the carbon nanofibers in the composite metal materials of Examples 1 to 3 was good, and that the carbon nanofibers were not sufficiently dispersed in the composite metal material Comparative Example 2 since many aggregates were observed.

According to the invention, it was found that a composite metal material having uniform mechanical properties, in which carbon nanofibers generally having poor dispersibility in a matrix are uniformly dispersed, can be obtained. According to the invention, it was also found that a composite metal material having excellent mechanical properties can be obtained by an improvement of the wettability between the carbon-based material and aluminum as the matrix metal.

TABLE 1

| | | Example 1 | Example 2 | Example 3 | Comparative Example 1 | Comparative Example 2 |
|---|---|---|---|---|---|---|
| Raw material elastomer | Polymer substance | Natural rubber (NR) | Natural rubber (NR) | Natural rubber (NR) | — | — |
| | Polar group | Double bond | Double bond | Double bond | — | — |
| | Average molecular weight | 3,000,000 | 3,000,000 | 3,000,000 | — | — |
| | T2n (30° C.) (μsec) | 700 | 700 | 700 | — | — |
| | T2n (150° C.) (μsec) | 5500 | 5500 | 5500 | — | — |
| | T2nn (150° C.) (μsec) | 18000 | 18000 | 18000 | — | — |
| | fnn (150° C.) | 0.381 | 0.381 | 0.381 | — | — |
| | Flow temperature (° C.) | 40 | 40 | 40 | — | — |
| Amount | Polymer (phr) | 100 | 100 | 100 | — | 0 |
| | Aluminum particle (phr) | 50 | 500 | 500 | — | 500 |
| | CNT (phr) | 0.5 | 10 | 10 | — | 6 |
| Composite elastomer (uncrosslinked sample) | Flow temperature (° C.) | 110° C. | 150° C. or higher | 150° C. or higher | — | — |
| | T2n (150° C.) (μsec) | 2050 | 1640 | 1230 | — | — |
| | T2nn (150° C.) (μsec) | 3950 | None | None | — | — |
| | fnn (150° C.) | 1.112 | 0 | 0 | — | — |
| | ΔT1 (msec/CNT 1 vol %) | 13.9 | 16.5 | 14.2 | — | — |
| XPS analysis result | Heat treatment (500° C., 2 hr) | Surface oxidation | Surface oxidation | Surface oxidation | — | None |
| EDS analysis result | Magnesium on surface of carbon-based material | Mg | Mg | Mg | — | None |
| Composite metal material (aluminum matrix) | CNT content of composite metal material (vol %) | 0.4 | 1.6 | 3.2 | 0 | 1.6 |
| | CNT dispersion state (SBM) | Good | Good | Good | — | Bad |
| | Compressive yield strength maximum value (MPa) | 380 | 525 | 650 | 45 | 65 |
| | Compressive yield strength minimum value (MPa) | 280 | 430 | 520 | 36 | 33 |
| | Compressive yield strength mean value (MPa) | 320 | 480 | 580 | 40 | 51 |

From the results shown in Table 1, the following items were confirmed by Examples 1 to 3 according to the invention.

From the XPS analysis results of the carbon-based materials of Examples 1 to 3, it was found that the carbon-based material bad a structure in which the surface of the carbon-based material was oxidized and oxygen bonded to the carbon atom of the carbon nanofiber.

The compressive yield strength of the composite metal materials of Examples 1 to 3 was greater than that of Comparative Examples 1 and 2. In particular, a significant increase in the compressive yield strength is confirmed by comparison between Example 2 and Comparative Example 2, in which the carbon nanofiber content of the matrix metal (aluminum) was 1.6 vol %. While the variation in the compressive yield strength of the composite metal material of Comparative Example 2 was about ±30%, the variation in the compressive yield strength of the composite metal materials of Examples Although only some embodiments of the invention have been described in detail above, those skilled in the art will readily appreciate that many modifications am possible in the embodiments without departing from the novel teachings and advantages of this invention. Accordingly, all such modifications are intended to be included within the scope of this invention.

What is claimed is:

1. A method of producing a composite metal material, the method comprising:
  (a) mixing at least a first carbon material and a particulate metal material Z into an elastomer, and dispersing the first carbon material and the metal material Z by applying a shear force to obtain a composite elastomer, the metal material Z having a melting point lower than a melting point of the first carbon material;

(b) heat-treating the composite elastomer in an atmosphere containing oxygen to vaporize the elastomer included in the composite elastomer to obtain an intermediate composite material including a second carbon material, wherein the second carbon material is derived from the first carbon material and the metal material Z;

(c) heat-treating the intermediate composite material together with a substance including an element Y having a melting point lower than the melting point of the metal material Z to vaporize the substance including the element Y;

(d) grinding a composite material obtained by the step (c) to powder, the composite material including a carbon-based material and the metal material Z; and (e) powder forming the composite material to obtain the composite metal material, wherein:

the metal material Z is aluminum or an alloy containing aluminum as a major component;

the element Y is magnesium;

the heat treatment temperature in the step (b) is set at a point lower than the vaporization temperature of the substance including the element Y;

the heat treatment temperature in the step (c) is set at a point higher than the heat treatment temperature in the step (b), the heat treatment temperature in the step (c) is set at a point equal to or higher than the vaporization temperature of the substance including the element Y, and the heat treatment temperature in the step (c) is set at a point lower than the vaporization temperatures of the metal material Z and the first carbon material;

a surface of the first carbon material activated in the step (a) bonds to oxygen present in the atmosphere inside a furnace by the heat treatment in the step (b) to obtain the second carbon material having a surface oxidized; and the composite metal material has a compressive yield strength mean value of 320 MPa or more.

2. A method of producing a composite metal material, the method comprising:

(a) mixing at least a first carbon material and a particulate metal material Z into an elastomer, and dispersing the first carbon material and the metal material Z by applying a shear force to obtain a composite elastomer, the metal material Z having a melting point lower than a melting point of the first carbon material;

(b) heat-treating the composite elastomer in an atmosphere containing oxygen to vaporize the elastomer included in the composite elastomer to obtain an intermediate composite material including a second carbon material, wherein the second carbon material is derived from the first carbon material and the metal material Z;

(c) heat-treating the intermediate composite material together with a substance including an element Y having a melting point lower than the melting point of the metal material Z to vaporize the substance including the element Y;

(d) grinding a composite material obtained by the step (c) to powder, the composite material including a carbon-based material and the metal material Z; and (e) causing a molten matrix metal material to permeate the composite material to obtain the composite metal material, wherein:

the metal material Z is aluminum or an alloy containing aluminum as a major component;

the element Y is magnesium;

the heat treatment temperature in the step (b) is set at a point lower than the vaporization temperature of the substance including the element Y;

the heat treatment temperature in the step (c) is set at a point higher than the heat treatment temperature in the step (b), the heat treatment temperature in the step (c) is set at a point equal to or higher than the vaporization temperature of the substance including the element Y, and the heat treatment temperature in the step (c) is set at a point lower than the vaporization temperatures of the metal material Z and the first carbon material;

a surface of the first carbon material activated in the step (a) bonds to oxygen present in the atmosphere inside a furnace by the heat treatment in the step (b) to obtain the second carbon material having a surface oxidized;

a material for the matrix metal material is the same as a material for the metal material Z; and the composite metal material has a compressive yield strength mean value of 320 MPa or more.

3. The method of producing a composite metal material as defined in claim 1, wherein the step (b) is performed in the presence of a substance including an element X so that the element X bonds to a carbon atom of the first carbon material; and wherein the element X includes at least one element selected from boron, nitrogen, oxygen, and phosphorus.

4. The method of producing a composite metal material as defined in claim 2, wherein the step (b) is performed in the presence of a substance including an element X so that the element X bonds to a carbon atom of the first carbon material; and wherein the element X includes at least one element selected from boron, nitrogen, oxygen, and phosphorus.

5. The method of producing a composite metal material as defined in claim 3, wherein the composite elastomer includes the substance having the element X; and wherein the element X bonds to a carbon atom of the first carbon material by the heat treatment in the step (b).

6. The method of producing a composite metal material as defined in claim 4, wherein the composite elastomer includes the substance having the element X; and wherein the element X bonds to a carbon atom of the first carbon material by the heat treatment in the step (b).

7. The method of producing a composite metal material as defined in claim 1, wherein the substance including the element Y is mixed with the elastomer in the step (a).

8. The method of producing a composite metal material as defined in claim 2, wherein the substance including the element Y is mixed with the elastomer in the step (a).

9. The method of producing a composite metal material as defined in claim 1, wherein, in the step (c), the substance including the element Y is disposed in a heat treatment furnace together with the second carbon material and vaporized by the heat treatment.

10. The method of producing a composite metal material as defined in claim 2, wherein, in the step (c), the substance including the element Y is disposed in a heat treatment furnace together with the second carbon material and vaporized by the heat treatment.

11. The method of producing a composite metal material as defined in claim 1, wherein the first carbon material is carbon black.

12. The method of producing a composite metal material as defined in claim 2, wherein the first carbon material is carbon black.

13. The method of producing a composite metal material as defined in claim 1, wherein the first carbon material is carbon fiber.

14. The method of producing a composite metal material as defined in claim 2, wherein the first carbon material is carbon fiber.

15. The method of producing a composite metal material as defined in claim 13, wherein the carbon fiber is carbon nanofiber.

16. The method of producing a composite metal material as defined in claim 14, wherein the carbon fiber is carbon nanofiber.

17. The method of producing a composite metal material as defined in claim 15, wherein the carbon nanofibers have an average diameter of 0.5 to 500 nm.

18. The method of producing a composite metal material as defined in claim 16, wherein the carbon nanofibers have an average diameter of 0.5 to 500 nm.

19. The method of producing a composite metal material as defined in claim 1, wherein the elastomer has a molecular weight of 5,000 to 5,000,000.

20. The method of producing a composite metal material as defined in claim 2, wherein the elastomer has a molecular weight of 5,000 to 5,000,000.

21. The method of producing a composite metal material as defined in claim 1, wherein at least one of a main chain, a side chain, and a terminal chain of the elastomer includes at least one unsaturated bond or group having affinity to carbon nanofibers selected from the group consisting of a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

22. The method of producing a composite metal material as defined in claim 2, wherein at least one of a main chain, a side chain, and a terminal chain of the elastomer includes at least one unsaturated bond or group having affinity to carbon nanofibers selected from the group consisting of a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

23. The method of producing a composite metal material as defined in claim 1, wherein a network component of the elastomer in an uncrosslinked form has a spin-spin relaxation time ($T2n$) of 100 to 3,000 μsec, measured at 30° C. by a Hahn-echo method using a pulsed nuclear magnetic resonance (NMR) technique.

24. The method of producing a composite metal material as defined in claim 2, wherein a network component of the elastomer in an uncrosslinked form has a spin-spin relaxation time ($T2n$) of 100 to 3,000 μsec, measured at 30° C. by a Hahn-echo method using a pulsed nuclear magnetic resonance (NMR) technique.

25. The method of producing a composite metal material as defined in claim 1, wherein a network component of the elastomer in a crosslinked form has a spin-spin relaxation time ($T2n$) of 100 to 2,000 μsec, measured at 30° C. by a Hahn-echo method using a pulsed nuclear magnetic resonance (NMR) technique.

26. The method of producing a composite metal material as defined in claim 2, wherein a network component of the elastomer in a crosslinked form has a spin-spin relaxation time ($T2n$) of 100 to 2,000 μsec, measured at 30° C. by a Hahn-echo method using a pulsed nuclear magnetic resonance (NMR) technique.

27. The method of producing a composite metal material as defined in claim 1, wherein the elastomer is natural rubber or nitrile butadiene rubber.

28. The method of producing a composite metal material as defined in claim 2, wherein the elastomer is natural rubber or nitrile butadiene rubber.

29. The method of producing a composite metal material as defined in claim 1, wherein the step (a) is performed by using an open roll method with a roll interval of 0.5 mm or less.

30. The method of producing a composite metal material as defined in claim 2, wherein the step (a) is performed by using an open roll method with a roll interval of 0.5 mm or less.

31. The method of producing a composite metal material as defined in claim 29, wherein two rolls used in the open-roll method have a surface velocity ratio of 1.05 to 3.00.

32. The method of producing a composite metal material as defined in claim 30, wherein two rolls used in the open-roll method have a surface velocity ratio of 1.05 to 3.00.

33. The method of producing a composite metal material as defined in claim 1, wherein the step (a) is performed by using an internal mixing method.

34. The method of producing a composite metal material as defined in claim 2, wherein the step (a) is performed by using an internal mixing method.

35. The method of producing a composite metal material as defined in claim 1, wherein the step (a) is performed by using a multi-screw extrusion kneading method.

36. The method of producing a composite metal material as defined in claim 2, wherein the step (a) is performed by using a multi-screw extrusion kneading method.

37. The method of producing a composite metal material as defined in claim 1, wherein the step (a) is performed at 0 to 50° C.

38. The method of producing a composite metal material as defined in claim 2, wherein the step (a) is performed at 0 to 50° C.

* * * * *